(12) United States Patent
Watanabe et al.

(10) Patent No.: US 11,793,110 B2
(45) Date of Patent: Oct. 24, 2023

(54) WORK MACHINE WITH HEIGHT ADJUSTABLE WORK UNIT

(71) Applicant: HONDA MOTOR CO., LTD., Tokyo (JP)

(72) Inventors: Kei Watanabe, Saitama (JP); Takuma Namiki, Saitama (JP); Kenji Iseki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 652 days.

(21) Appl. No.: 16/926,872

(22) Filed: Jul. 13, 2020

(65) Prior Publication Data

US 2021/0037706 A1 Feb. 11, 2021

(30) Foreign Application Priority Data

Aug. 9, 2019 (JP) .................................. 2019-147597

(51) Int. Cl.
*A01D 34/74* (2006.01)
*A01D 34/78* (2006.01)
*A01D 34/00* (2006.01)
*A01D 101/00* (2006.01)

(52) U.S. Cl.
CPC .............. *A01D 34/74* (2013.01); *A01D 34/78* (2013.01); *A01D 34/008* (2013.01); *A01D 2101/00* (2013.01)

(58) Field of Classification Search
CPC ....... A01D 34/008; A01D 34/74; A01D 34/78
See application file for complete search history.

(56) References Cited

U.S. PATENT DOCUMENTS

| 5,351,467 A | * | 10/1994 | Trefz | ..................... A01D 34/74 56/16.3 |
| 8,234,848 B2 | | 8/2012 | Messina et al. | |

FOREIGN PATENT DOCUMENTS

| AU | 2019202379 B2 | * | 10/2020 | ........... A01D 34/001 |
| CN | 107211645 A | * | 9/2017 | |
| CN | 206533741 U | * | 10/2017 | ........... A01D 34/008 |
| CN | 107852942 A | * | 3/2018 | ............ A01D 34/68 |
| CN | 113115628 A | * | 7/2021 | |
| EP | 2412220 A1 | | 2/2012 | |
| EP | 3183949 A1 | * | 6/2017 | ........... A01D 34/008 |
| GB | 1010482 A | | 11/1965 | |

\* cited by examiner

*Primary Examiner* — Alicia Torres
(74) *Attorney, Agent, or Firm* — Armstrong Teasdale LLP

(57) ABSTRACT

A work machine (10) such as a lawnmower provided with a height adjusting mechanism comprises a machine main body (12), a guide member (50) provided on the machine main body so as to be rotatable around a vertical axis, a support member (60) engaged by the guide member via a converting mechanism that converts a rotational motion of the guide member into a vertical motion of the support member, a work unit (18) supported by the support member, and a sheet spring (86) provided on the machine main body and resiliently and slidably abutting against the adjusting driven member to urge the adjusting driven member in a downward direction.

14 Claims, 9 Drawing Sheets

WORK MACHINE WITH HEIGHT ADJUSTABLE WORK UNIT

TECHNICAL FIELD

The present invention relates to a work machine, and in particular to a work machine having a vertically adjustable work unit.

BACKGROUND ART

It is known to allow a work unit of a work machine to be vertically adjustable. As one of such work machines, a lawnmower may be provided with a height adjusting mechanism for adjusting the height of the cutting blade from the ground surface. See GB1010482A and EP2412220A1, for instance.

The height adjusting mechanism of the lawnmower disclosed in GB1010482A includes a fixed hollow cylindrical guide member having a vertically extending central axis and a cylindrical support member carrying a drive unit (engine) for the cutting blade and centrally received in the hollow interior of the guide member. A spiral slot cam mechanism is formed between the inner circumferential surface of the guide member and the outer circumferential surface of the support member so that the height of the support member along with the cutting blade may be vertically adjusted by turning the support member relative to the guide member around the central axis thereof.

The height adjusting mechanism of the lawnmower disclosed in EP2412220A1 includes a fixed hollow cylindrical guide member having a vertically extending central axis and a cylindrical support member carrying a drive unit (engine) for the cutting blade and centrally received in the hollow interior of the guide member. A screw thread mechanism is formed between the inner circumferential surface of the guide member and the outer circumferential surface of the support member so that the height of the support member along with the cutting blade may be vertically adjusted by turning the support member relative to the guide member around the central axis thereof.

However, the height adjusting mechanisms of the conventional lawnmowers are known to have the problem that the height of the cutting blade may not be entirely stable. Due to fluctuations on the loading of the blade, and vibrations of various parts, the support member tends to rattle relative to the guide member. In extreme cases, the support member may inadvertently drop in height due to such load fluctuations and vibrations with the result that the cutting height becomes uneven, and a desired grass cutting quality may not be obtained.

SUMMARY OF THE INVENTION

In view of such a problem of the prior art, a primary object of the present invention is to provide a work machine having a vertically adjustable work unit that can operate in a stable manner so as to achieve a favorable work result.

To achieve such an object, the present invention provides a work machine (10), comprising: a machine main body (12); an adjusting drive member (50) supported on the machine main body against a downward movement so as to be rotatable around a vertical axis; an adjusting driven member (60) engaged by the adjusting drive member via a converting mechanism that converts a rotational motion of the adjusting drive member into a vertical motion of the adjusting driven member; a work unit (18) supported by the adjusting driven member; and a first elastic member (86) provided on the machine main body and resiliently and slidably abutting against the adjusting drive member to urge the adjusting drive member in a downward direction.

Thereby, the rattling of the adjusting drive member in the vertical direction with respect to the machine main body is suppressed so that the height adjusting mechanism is allowed to operate in a stable manner, and a favorable work result can be obtained.

In this work machine, preferably, the adjusting drive member comprises a ring member having a female screw thread on an inner circumferential surface thereof, and the adjusting driven member comprises a support member supporting the work unit, and having a male screw thread on an outer circumferential surface thereof threaded into the female screw thread, a rotation preventing mechanism for preventing the support member from rotating relative to the machine main body, but allowing the support member to move vertically being interposed between the support member and the machine main body.

Thereby, the rotational movement of the adjusting drive member can be reliably and efficiently converted into the vertical movement of the adjusting driven member owing to the screw thread engagement.

In this work machine, preferably, the rotation preventing mechanism comprises a vertical surface (64) formed on the support member at an angle to a circumferential direction thereof, and a second elastic member (66) secured to the machine main body and resiliently abutting against the vertical surface.

According to this configuration, the adjusting driven member is prevented from rotating when the adjusting drive member is rotated for a height adjusting action in a reliable manner, and the second elastic member allows the adjusting driven member to move in the vertical direction without applying any significant frictional force thereto.

In this work machine, preferably, the adjusting drive member rests upon an upper surface (40A) of the machine main body at a lower surface (50A) thereof.

Thereby, the downward movement of the adjusting drive member can be accomplished without causing any undue friction to the rotational movement of the adjusting drive member.

In this work machine, preferably, the upper surface of the machine main body is provided with an arcuate rib (52) extending upright therefrom, and the lower surface of the adjusting drive member is provided with an arcuate recess (54) receiving the arcuate rib so as to allow the adjusting drive member to rotate and move upward along the arcuate rib.

Thereby, the adjusting drive member can be guided for the rotational movement thereof with minimal friction by using a highly simple structure. This arrangement also allows a slight upward movement of the adjusting drive member so that the upward impact which the work unit may receive can be favorably accommodated.

In this work machine, preferably, the first elastic member comprises a sheet spring having a base end secured to the machine main body, and a contact part extending from the base end and abutting against the upper surface of the adjusting drive member.

Thereby, the rattling of the adjusting drive member in the vertical direction relative to the machine main body can be minimized.

In this work machine, preferably, the first elastic member comprises a pair of sheet springs arranged in a mutually line symmetric relationship in plan view.

Thereby, a downward pressure can be applied to the adjusting drive member in a uniform manner so that the stability of the adjusting drive member can be maximized.

In this work machine, preferably, the upper surface of the adjusting drive member is formed with a plurality of recesses arranged circumferentially and each configured to receive the contact part of the sheet spring.

Thereby, the movement of the adjusting drive member is clearly and reliably defined so that the height adjustment can be performed in a precise manner.

In this work machine, preferably, the contact part of the sheet spring is bent or curved around an axial line extending horizontally and orthogonal to an extending direction of the sheet spring, and the recesses each consist of a groove configured to receive the contact part.

Thereby, the friction between the sheet spring and the adjusting drive member is minimized, and a favorable detent action can be achieved by the cooperation between the contact part and the recesses.

In this work machine, preferably, the sheet spring extends in a tangential direction with respect to the adjusting drive member, and each groove extends in a radial direction.

The sheet spring engages the adjusting drive member at the trailing end thereof so that friction between the contact part and the upper surface of the adjusting drive member is minimized, and a favorable detect action can be achieved.

Alternatively, the sheet spring extends in a direction at an angle to each of a tangential direction and a radial direction with respect to the adjusting drive member, and each groove extends in a lateral direction with respect to the extending direction of the sheet spring.

The sheet spring still engages the adjusting drive member at the trailing end thereof, and the length of the sheet spring in the extending direction is not required to be unduly increased.

In this work machine, preferably, the work machine comprises an electric motor configured to rotationally drive the adjusting drive member to any one a plurality of discrete angular positions, and the recesses are positioned so as to correspond to the discrete angular positions of the adjusting drive member.

Thereby, the movement of the adjusting drive member is particularly clearly and reliably defined so that the height adjustment can be performed in a precise manner.

The work machine may further comprise gear teeth formed along an outer periphery of the ring member, a pinion rotatably supported by the machine main body and meshing with the gear teeth, and an electric motor configured to rotationally drive the pinion.

Thereby, the height adjustment of the work unit supported by the adjusting driven member can be performed by using electric power without unduly complicating the overall structure.

In this work machine, preferably, the adjusting driven member is provided with a hollow interior, and the work unit includes an electric motor received in the hollow interior and having a downwardly extending output shaft, and a cutting blade fitted on the output shaft.

Thus, a lawnmower that can adjust the height of the cutting blade in a favorable manner can be provided.

Thus, the present invention provides a work machine having a vertically adjustable work unit that can operate in a stable manner so as to achieve a favorable work result.

DESCRIPTION OF THE PREFERRED EMBODIMENT(S)

A lawnmower as an embodiment of the working machine of the present invention is described in the following with reference to FIGS. 1 to 6.

Figure 1:
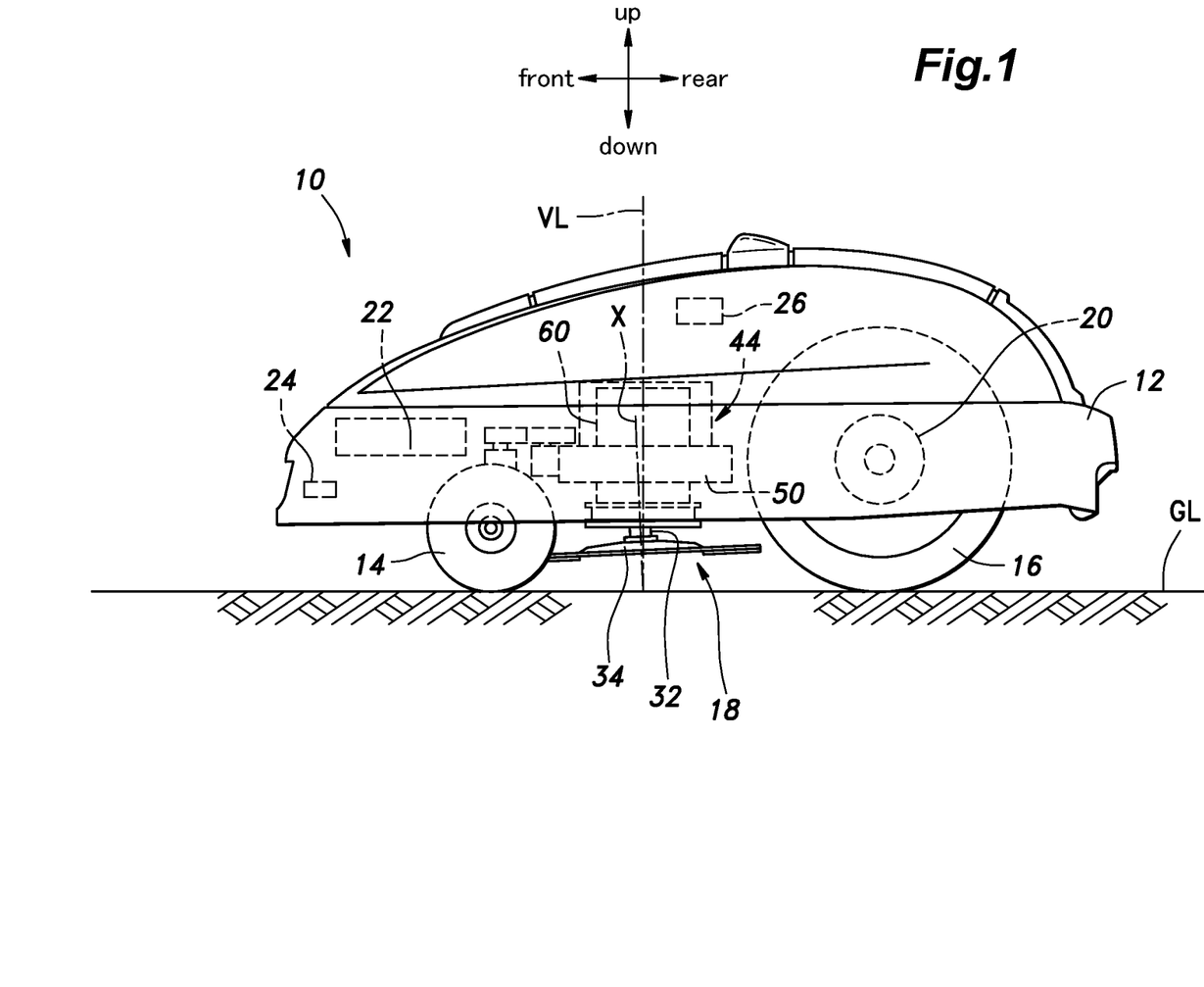
FIG. 1 is a side view showing a working machine according to an embodiment of the present invention as applied to a lawnmower.

As shown in FIG. 1, the lawnmower 10 is an autonomous driving lawnmower (often referred to as robotic lawnmower) that can autonomously travel to mow the grass. The lawnmower 10 includes a lawnmower main body (main body) 12, a pair of front wheels 14 and a pair of rear wheels 16 provided on the lawnmower main body 12, and a mowing work unit 18 provided centrally at the bottom of the lawnmower main body 12. The rear wheels 16 are individually driven by a pair of travel motors 20, respectively.

The lawnmower main body 12 is provided with a battery 22 that supplies power to the travel motors 20 and other electric devices, a detection sensor group 24 which may include an obstacle detection sensor (such as a contact sensor), an angular velocity sensor, an acceleration sensor, etc., and a control unit 26 that controls the driving of the travel motors 20 and the mowing work unit 18 according to the detection signals of the detection sensor group 24.

The lawnmower 10 can travel straight forward and rearward by driving the travel motors 20 in the forward and rearward direction, respectively, at a same speed, and can turn right and left by driving the travel motors 20 at different speeds in corresponding manners.

The mowing work unit 18 includes a mower motor (electric motor) 30 having a downwardly extending output shaft 32, and a mower blade 34 attached to the lower end of the output shaft 32 of the mower motor 30. The mower blade 34 is rotatably driven by the mower motor 30 to mow the lawn.

The mowing work unit 18 is supported by the lawnmower main body 12 via a support member 60 (which will be described hereinafter) in a vertically adjustable manner so that the cutting grass height can be selected.

The rotational axis of the output shaft 32 of the lawnmower motor 30, or in other words, the center axis X of the mower blade 34 extends in a direction which is slightly tilted forward with respect to the vertical direction of the lawnmower main body 12 (the vertical line VL which is orthogonal to the ground surface plane GL). More specifically, the center axis X of the mower blade 34 displaces rearward toward the lower end thereof with respect to the vertical direction of the lawnmower main body 12. Thereby, the freshly cut grass is prevented from being rubbed by the rear part of the mower blade 34 as the mower 10 travels forward.

The details of the mowing work unit 18 are described in the following with reference to FIGS. 2 to 6.

Figure 2:
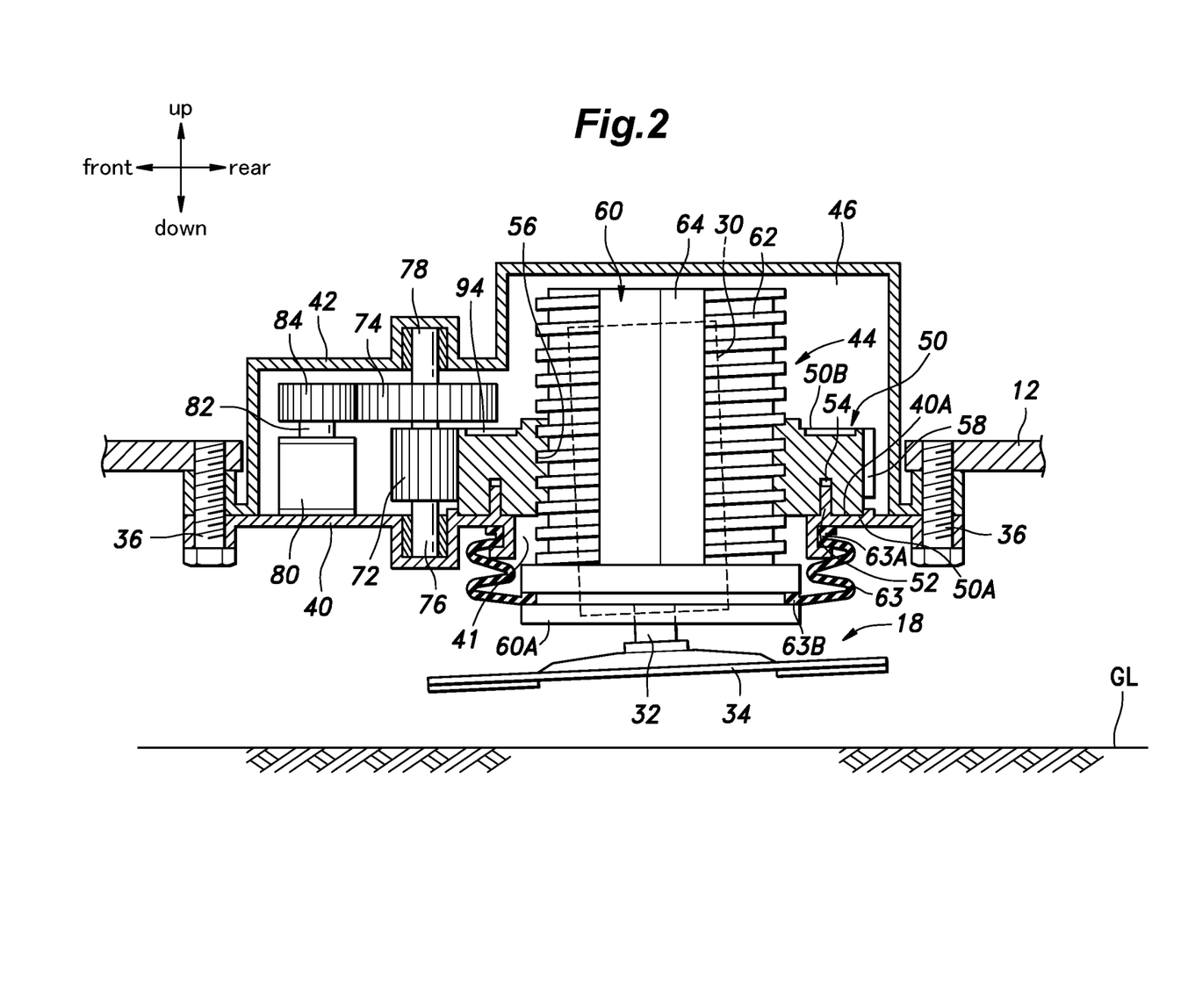
FIG. 2 is a vertical sectional view of a main part of the lawnmower of the present embodiment.

As shown in FIG. 2, the lawnmower 10 is provided with a lower casing 40 and an upper casing 42 which are jointly fastened to a frame (chassis) 12 that forms part of the lawnmower main body 12 by using a plurality of bolts 36. For the purpose of this disclosure, the lower casing 40 and the upper casing 42 may be considered as part of the lawnmower main body 12.

The lower casing 40 and the upper casing 42 jointly define a housing chamber 46 that accommodates a height adjustment mechanism 44.

The height adjustment mechanism 44 includes an annular ring member 50 having a female screw thread 56 formed on the inner circumferential surface thereof in a coaxial relationship to the center axis X of the mower blade 34, and a cylindrical support member 60 having a male screw thread 62 which is formed on the outer circumferential surface thereof, and is threaded into the female screw thread 56 of the annular ring member 50.

The annular ring member 50 has an annular flat lower surface 50A which slidably rests upon a flat upper surface 40A of the lower casing 40. The lower casing 40 is provided with a central opening 41 through which the cylindrical support member 60 extends. The lower surface 50A of the annular ring member 50 is formed with an annular recess 54 in a coaxial relationship to the female screw thread 56. The upper surface 40A of the lower casing 40 is provided with an annular rib 52 which projects upward and extends circumferentially, and is received in the annular recess 54 in a complementary and mutually slidable manner.

Figure 3:
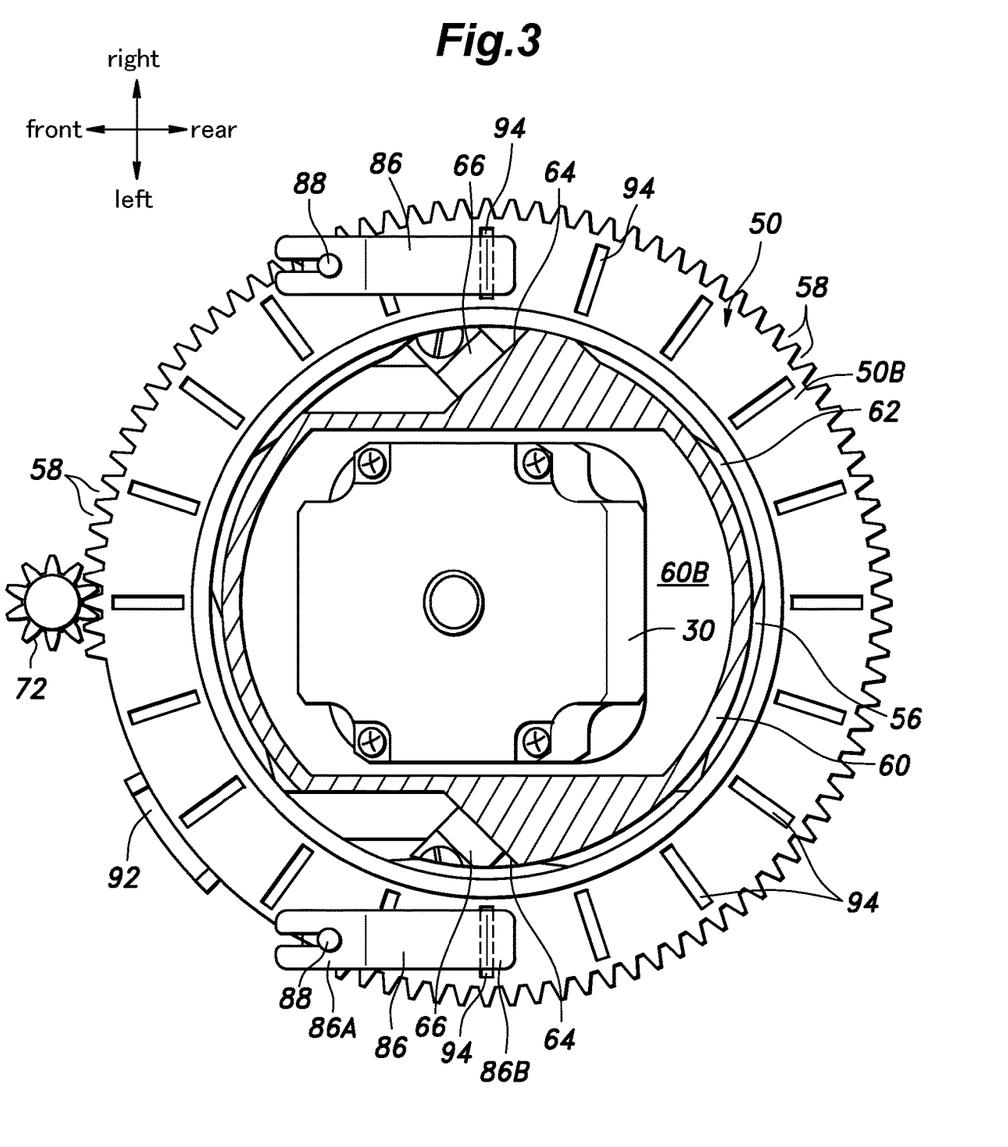
FIG. 3 is a plan view of a main part of the lawnmower.

The outer circumferential surface of the annular ring member 50 is formed with external gear teeth 58. The female screw thread 56 may not extend over the entire circumference, but may be partly omitted along the circumferential direction as in an interrupted screw as shown in FIG. 3.

The support member 60 is prevented from rotating around the center axis thereof as will be described hereinafter. Therefore, when the ring member 50 is rotated around the axis thereof (which coincides with the axis of the support member 60), the support member 60 is actuated in the vertical direction.

Figure 4:
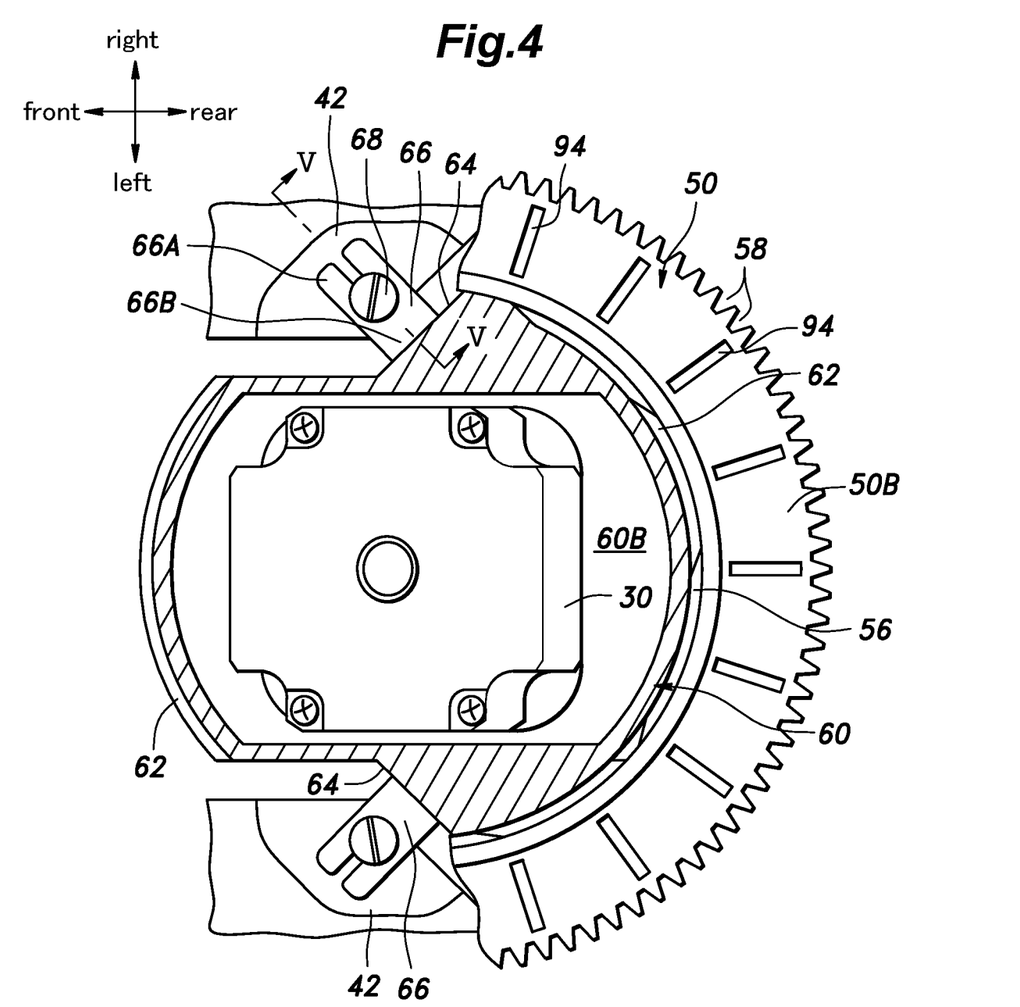
FIG. 4 is a plan view showing a main part of the lawnmower partly in section.
Figure 5:
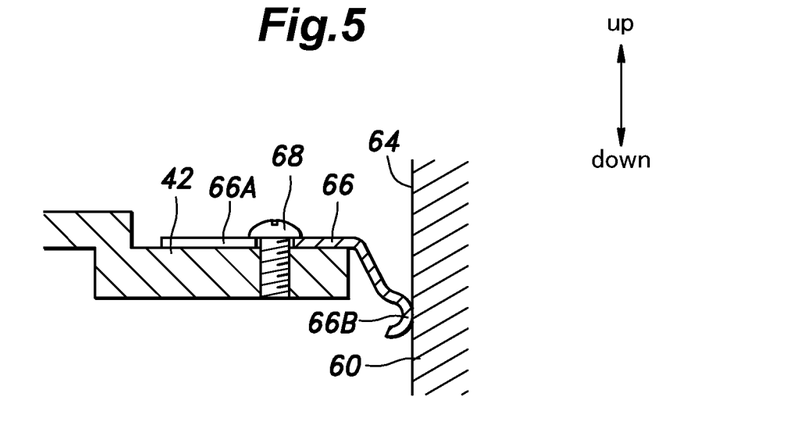
FIG. 5 is a sectional view taken along line V-V in FIG. 4.

The lower end part 60A of the support member 60 protrudes downward from the opening 41 formed in the lower casing 40. As shown in FIGS. 3 and 4, the mower motor 30 is housed in the hollow interior 60B of the support member 60, and is fixedly secured to the support member 60. The output shaft 32 of the mower motor 30 protrudes downward from the lower end part 60A of the support member 60, and the mower blade 34 is attached to the lower end thereof. As a result, the height of the mower blade 34 from the ground can be changed so as to change the mowing height by vertically displacing the support member 60.

A rubber seal member 43 in the form of a cylindrical bellows is provided between the lower casing 40 and a lower end part 60A of the support member 60. The seal member 43 includes an upper end 43A that is attached to the lower casing 40 on the periphery of the opening 41 and a lower end 43B that is attached to the lower end part 60A of the support member 60 to prevent mowed grass, rainwater, etc. from entering the housing chamber 46. In particular, the screw thread engagement between the female screw thread 56 and the male screw thread 62 is protected from the intrusion of foreign matters.

The support member 60 is generally cylindrical in shape, but has a pair of recesses, each defined by a pair of vertically extending planar vertical surfaces 64. As shown in FIGS. 3 and 4, the vertical surfaces 64 of each recess are at an obtuse angle relative to each other in plan view. The two recesses are line-symmetrical with respect to a horizontal line (extending in the fore and aft direction) passing through the axis of the support member 60. One of the vertical surfaces 64 of one of the recesses is substantially in parallel with one of the vertical surfaces of the other of the recesses. The other vertical surface 64 of one of the recesses is substantially orthogonal to the other vertical surface of the other recess. The vertical surfaces 64 which are substantially orthogonal to each other are each provided with a rotation prevention mechanism for preventing the rotation of the support member 60.

Since these two rotation prevention mechanisms are identical to each other (mirror images of each other), only one of them is described in the following. The rotation prevention mechanism includes a sheet spring 66 (second elastic member) having a base end 66A secured to a part of the upper casing 42 by a screw 68, and a free end 66B which is rounded and resiliently abuts against the vertical surface 64. The rounded free end 66B is configured to slide over the vertical surface 64 as the support member 60 moves vertically.

As a result, the support member 60 is held in place (or is prevented from rotating around the axis thereof) against the upper casing 42. The two rotation prevention mechanisms thus jointly urge the support member 60 against the ring member 50 in a rearward direction via the spring force of the sheet springs 66.

The ring member 50 is guided for a rotational movement by the engagement between the annular recess 54 of the ring member 50 and the annular rib 52 of the lower casing 40. The support member 60 is engaged by the ring member 50 via the threading of the female screw thread 56 of the ring member 50 and the male screw thread 62 of the support member 60. Thus, there are two sources of play that can affect the positional stability of the support member 60. Such play not only causes the rattling of the support member 60 but also impairs the stability of the vertical position of the support member 60. In order to ensure a favorable grass cutting quality, the vertical position of the blade 34 which is attached to the support member 60 is highly important.

Since the two rotation prevention mechanisms thus jointly urge the support member 60 against the ring member 50 in a rearward direction via the spring force of the sheet springs 66, the play between the support member 60 and the lower casing 40 in the fore and aft direction can be eliminated.

Since the vertical surfaces 64 of the two rotation prevention mechanisms are substantially at a right angle (90 degrees) in plan view, the support member 60 is resiliently urged in the lateral direction from both sides so that the lateral position of the support member 60 is stabilized. Thus, the support member 60 is prevented from rattling not only in the fore and aft direction but also in the lateral direction. As a result, the height adjustment mechanism 44 is enabled to operate in a stable manner, and the fluctuations in the height of the blade 34 can be minimized so that an improved grass cutting performance can be achieved.

Since each sheet spring 66 urges the support member 60 rearward against the lower casing 40, the sheet spring 66 is not subjected to the force caused by the resistance which the blade 34 receives from the grass during mowing. Thus, the sheet springs 66 are prevented from deflecting under the loading of the mowing operation so that the rattling of the height adjustment mechanism 44 during operation can be avoided, and the durability of the sheet springs 66 is improved. The absence of rattling in the height adjustment mechanism 44 contributes to the improvement in the mowing quality.

In addition, since the support member 60 is supported by the screw (thread) engagement between the ring member 50 and the support member 60 and by the force of the sheet springs 66 which resiliently contact the respective vertical surfaces 64 so as to be slidable in the vertical direction, the support member 60 can be supported so as to be freely moveable in the vertical direction. Thus, no complex linear guide mechanism is required so that the overall structure of the height adjustment mechanism 44 can be simplified.

Since each sheet spring 66 slidably contacts the corresponding vertical surface 64 at a free end 66B thereof which is bent, rounded or otherwise curved around an axial line extending in the horizontal direction, the support member 60 can be smoothly moved in the vertical direction without causing any undue friction between the sheet springs 66 and the corresponding vertical surfaces 64.

Further, the upper surface 50B of the ring member 50 is provided with a plurality of recesses are formed at equal intervals in the circumferential direction. In the illustrated embodiment, each recess consists of a groove 94 extending in the radial direction of the ring member 50. The free end 86B of the sheet spring 86 is bent, rounded or otherwise curved around a lateral direction so as to elastically fit into each groove 94. In the illustrated embodiment, the free end 86B has a substantially V shaped profile in side view with a relatively pointed end facing downward, and each groove 94 is substantially complementary in shape to the free end 86B. Thus, the free end 86B of the sheet spring 86 and the grooves 94 of the ring member 50 provide a detent action for the ring member 50.

As a result, the support member 60 can be resiliently retained at each of a plurality of vertical positions corresponding to such angular positions of the ring member 50 with a resilient detent action so that the support member 60 is prevented from abruptly dropping or otherwise changing the vertical position due to external forces such as vibration. This also contributes to maintaining the desired mowing height at all times.

If the height adjustment mechanism 44 (as is the case with the present embodiment as will be described hereinafter) is configured to position the support member 60 at a plurality of discrete vertical positions, the vertical positions of the grooves 70 may be selected so as to correspond to discrete angular positions of the ring member 50 corresponding to such discrete adjusted vertical positions of the support member 60.

The drive mechanism for the ring member 50 (or for the height adjustment mechanism 44) is described in the following with reference to FIGS. 2 and 6.

The lower casing 40 supports a pinion 72 within the housing chamber 46 so as to be freely rotatable around a vertical axial line. The pinion 72 engages external gear teeth 58 formed on the outer periphery of the ring member 50 in a power transmitting relationship. The ring member 50 may be able to rotate 360 degrees, but may also be able to rotate less than 360 degrees as is the case with the present embodiment. In the present embodiment, the external gear teeth 58 are provided over a rotational angular range of about 315 degrees.

Figure 6:
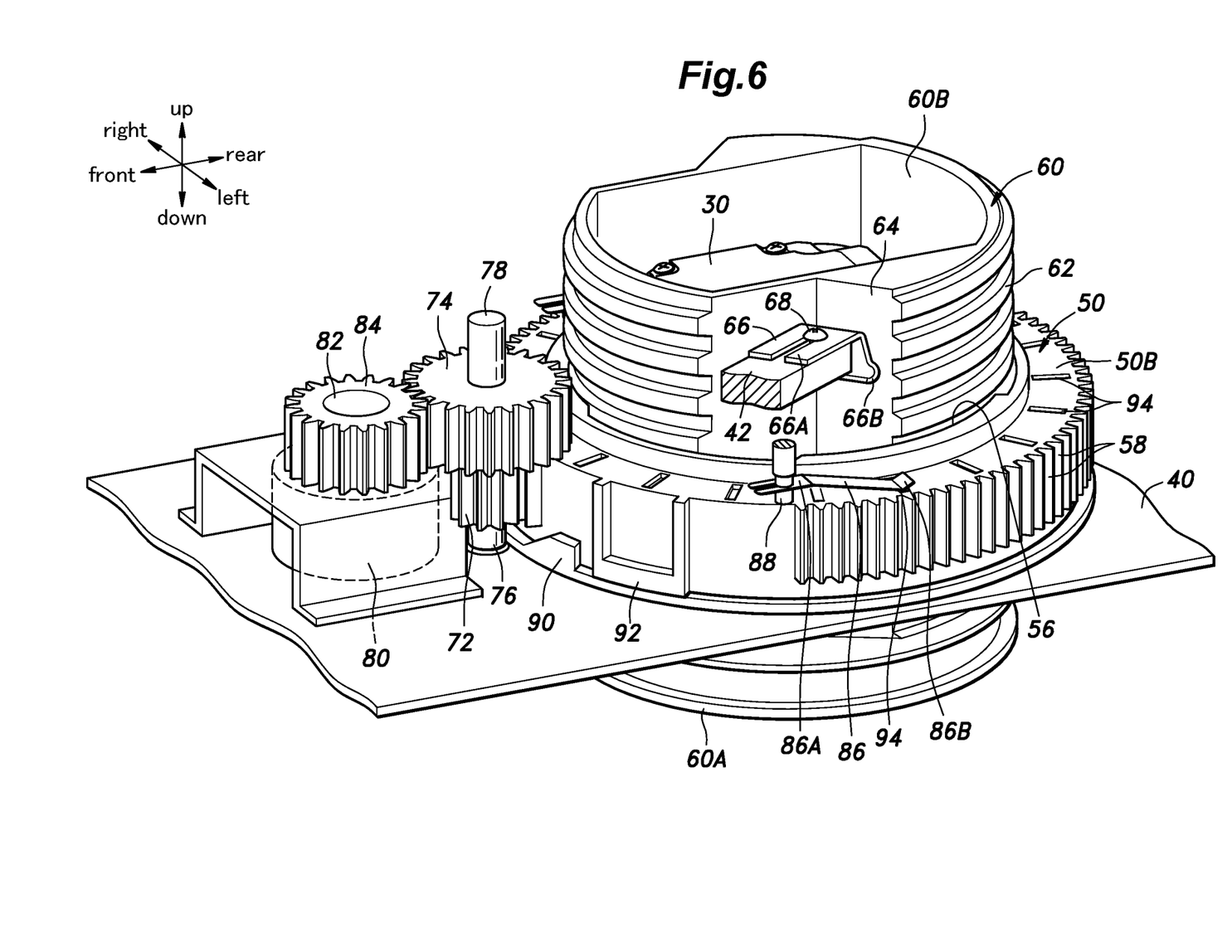
FIG. 6 is a perspective view of a main part of the lawnmower.

As shown in FIG. 6, the lower casing 40 is provided with a fixed stopper projection 90 projecting upward from the upper surface 40A thereof. The ring member 50 has a side stopper projection 92 projecting radially outwardly from the outer periphery thereof. The side stopper projection 92 limits the rotational angular range of the ring member 50 to 315 degrees by abutting against the fixed stopper projection 90.

A driven gear 74 is coaxially and integrally connected to the upper end of the pinion 72. The pinion 72 and the driven gear 74 are jointly supported by a pivot shaft 76 which is rotatably supported by the lower casing 40 and the upper casing 42 at the lower end and the upper end thereof, respectively.

A stepping motor 80 for height adjustment is attached to the lower casing 40. The stepping motor 80 is received in the housing chamber 46, and has an output shaft 82 projecting vertically upward therefrom. A drive gear 84 is attached to the output shaft 82, and meshes with the driven gear 74. As a result, the pinion 72 is rotatably driven by the stepping motor 80.

As mentioned earlier, the sheet springs 86 (first elastic members) are attached to the upper casing 42 inside the housing chamber 46 at the base ends 86A thereof. The sheet springs 86 are arranged on the right and left sides of the support member 60 in a line symmetrical relationship to each other with respect to the center line extending in the fore and aft direction in plan view (see FIG. 3). Each sheet spring 86 is resiliently and slidably in contact with the upper surface 50B of the ring member 50 at the free end 86B thereof. Thus, the sheet springs 86 resiliently urge the ring member 50 downward and slide over the upper surface 50B of the ring member 50 with little friction as the ring member 50 rotates.

Thus, the ring member 50 is prevented from rattling relative to the lower casing 40 in the vertical direction in spite of vibrations and other external forces caused by the operation of the lawnmower 10. As a result, the height adjustment mechanism 44 is prevented from rattling so that the stability of the height adjustment mechanism 44 is ensured, and a high mowing quality can be achieved.

The ring member 50 is restricted from moving downward since the lower surface 50A rests upon the upper surface 40A of the lower casing 40, but can move upward to a certain extent against the resilient force of the sheet springs 86 while the lateral movement of the ring member 50 relative to the lower casing 40 is restricted by the engagement between the annular rib 52 and the annular recess 54. Therefore, when an impulsive force or any other strong upward force is applied to the blade 34, the blade 34 is allowed to resiliently move upward along with the ring member 50 against the spring force of the sheet springs 86 so that the durability of the blade 34 can be improved, and the shock to the lawnmower 10 can be mitigated.

Thus, according to the first embodiment, the ring member 50 can be rotated by the stepping motor 80, and the resulting angular movement of the ring member 50 causes a corresponding vertical movement of the support member 60 owing to the screw thread engagement between the female screw thread 56 of the ring member 50 and the male screw thread 62 of the support member 60. The angular movement of the support member 60 is resiliently restricted by the engagement between the sheet springs 66 and the respective vertical surfaces 64 of the support member 60. The vertical movement of the ring member 50 is resiliently restricted by the sheet springs 86. The stepping motor 80 is configured to position the ring member 50 at any one of a plurality of discrete angular positions. Therefore, the stepping motor 80 allows the support member 60 to be adjusted to a plurality corresponding discrete vertical positions. In this conjunction, the grooves 94 on the upper surface 50B of the ring member 50 are positioned so as to correspond to such discrete vertical positions of the support member 60.

Figure 7:
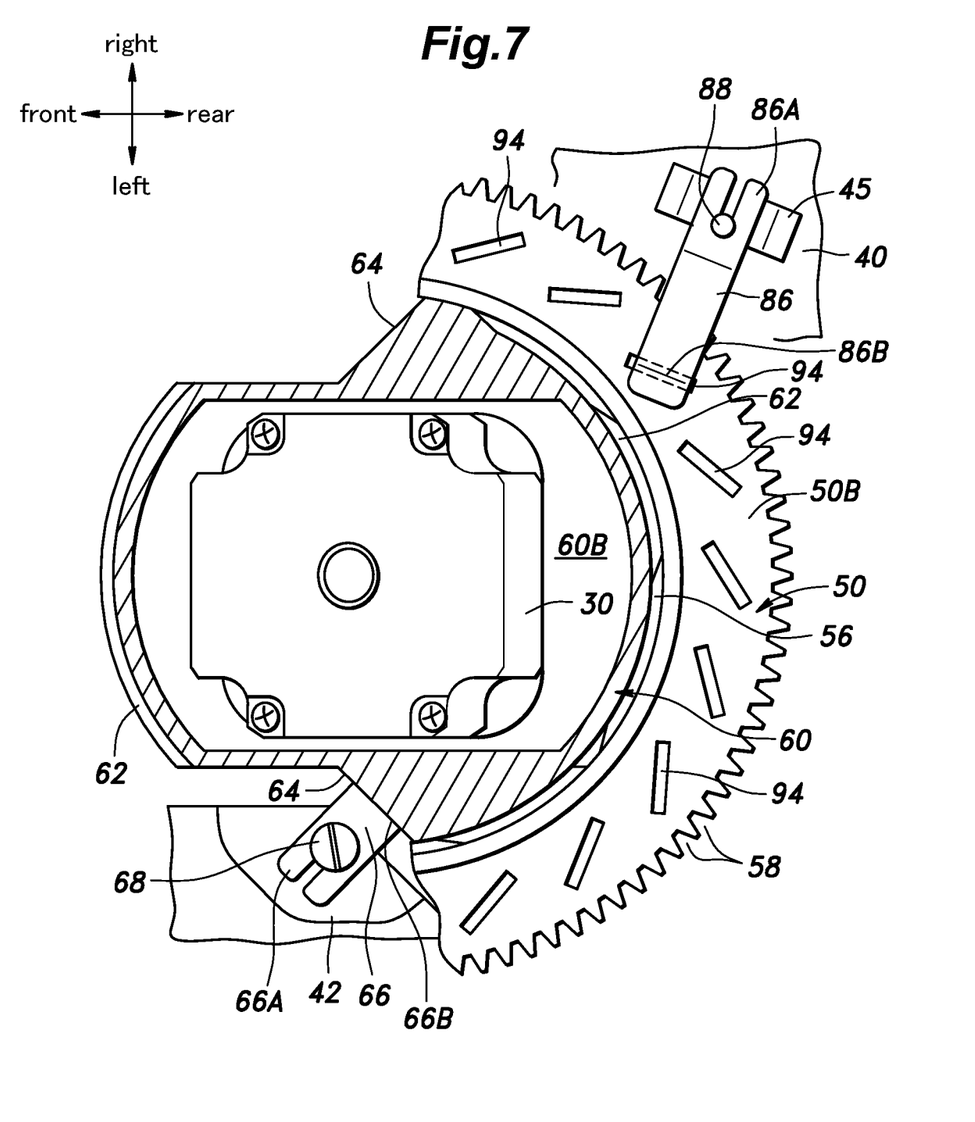
FIG. 7 is a plan view showing a main part of the lawnmower of another embodiment partly in section.
Figure 8:
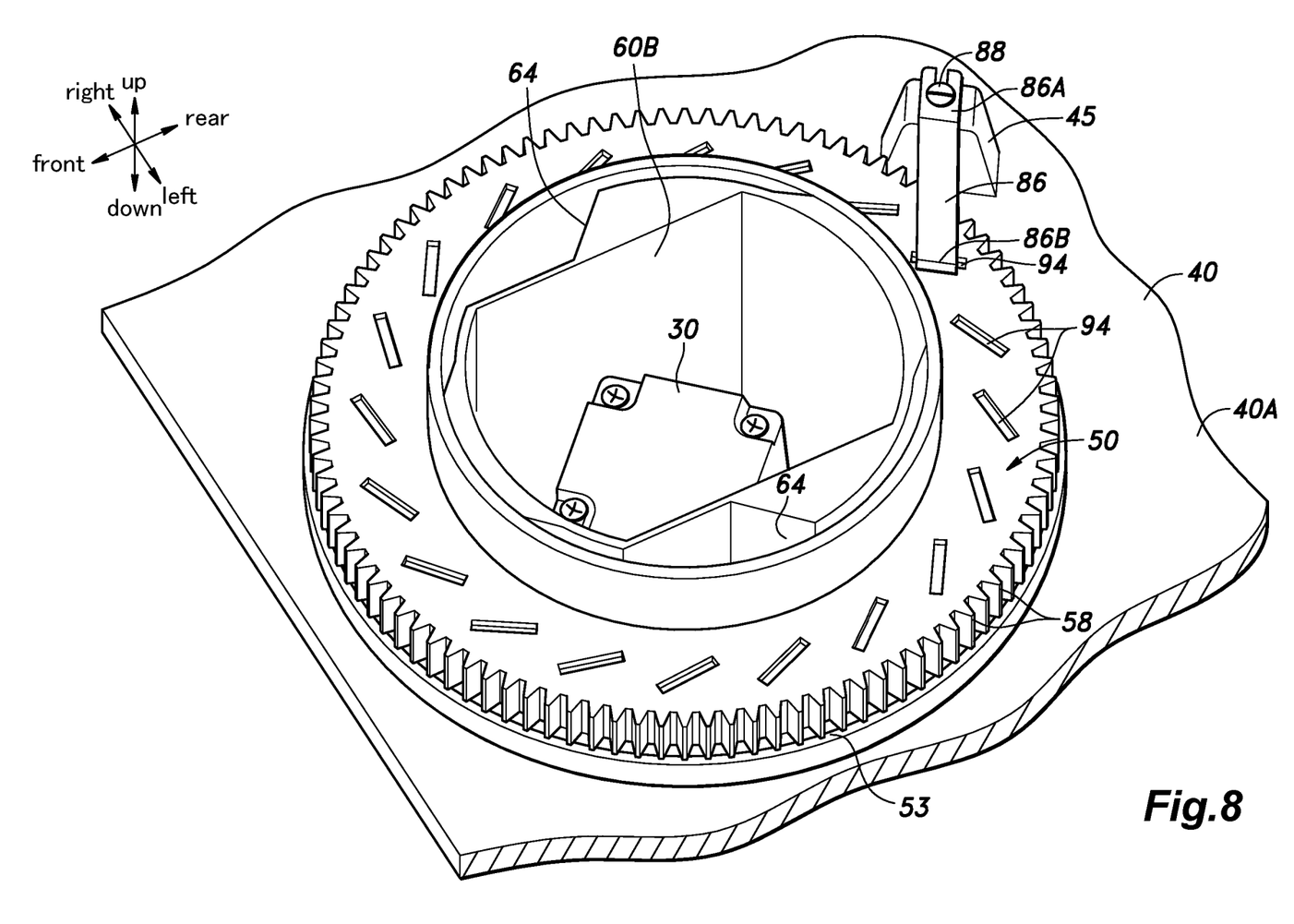
FIG. 8 is a perspective view of the lawnmower of the other embodiment partly in section.
Figure 9:
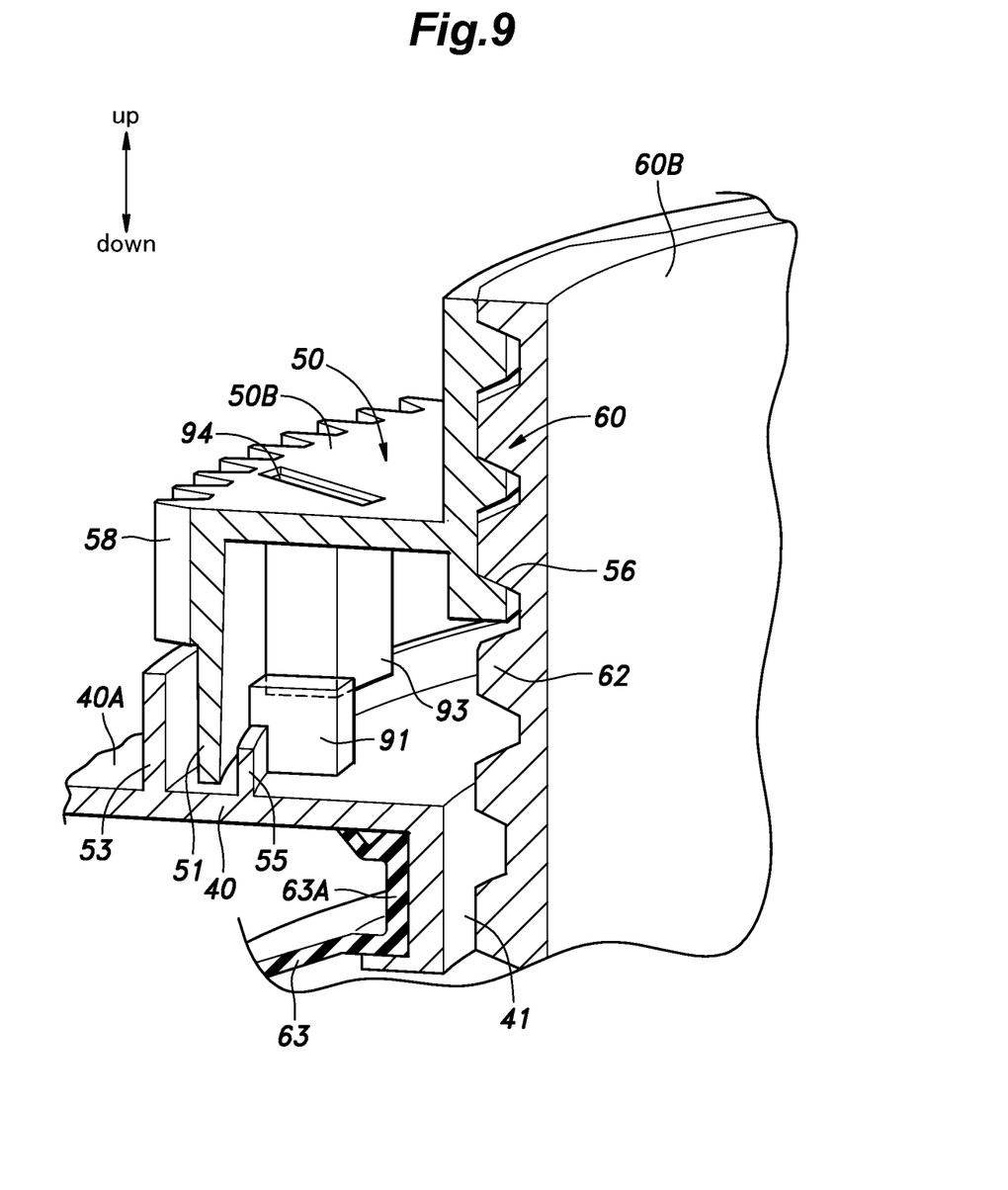
FIG. 9 is an enlarged sectional view of a main part of the lawnmower of the other embodiment.

FIGS. 7 to 9 show a second embodiment of the present invention. In FIGS. 7 to 9, the parts corresponding to those of the first embodiment are denoted with like numerals, and such parts may be omitted from the following description.

In the present embodiment, as shown in FIG. 9, the lower casing 40 is provided with a pair of mutually concentric cylindrically shaped ribs 53 and 55 that project vertically from the upper surface 40A thereof. The ring member 50 is provided with a cylindrical extension 51 projecting downwardly therefrom, and received in a gap defined between the two ribs 53 and 55. The outer rib 53 has a greater height than the inner rib 55. The upper end of the outer rib 53 opposes the lower end of the external gear teeth 58 with a small clearance. The lower end of the cylindrical extension 51 abuts against the upper surface of the lower casing 40 in a slidable manner.

A stopper projection 91 is formed in a part of the inner rib 55 so as to extend radially inward and vertically upward direction. The inner circumferential surface of the cylindrical extension 51 is formed with a stopper projection 93 which projects radially inward. The lower end of the stopper projection 93 is slightly higher than the upper end of the inner rib 55, but is substantially lower than the upper end of the stopper projection 91. The stopper projection 91 and the stopper projection 93 thus jointly define the rotational angular range of the ring member 50 to an angle small than 360 degrees. In the present embodiment, the rotational angular range of the ring member 50 is 315 degrees.

In the present embodiment, as shown in FIGS. 7 and 8, only one sheet spring 86 is attached to a pedestal portion 45 projecting upward from the lower casing 40 by a screw 88. The sheet spring 86 extends toward the upper surface 50B of the ring member 50 in an inclined direction which is at an angle to each of the tangential direction and the radial direction with respect to the ring member 50, and resiliently urges the ring member 50 in the downward direction. The ring member 50 is provided with a plurality of grooves 94 arranged at regular intervals on the upper surface 50B thereof, and each groove 94 extends substantially orthogonally to an extending direction of the sheet spring 86. The free end of the sheet spring 86 is bent or rounded, and is configured to be received in any one of the grooves 94 depending on the angular position of the ring member 50.

In this embodiment, the sheet spring 86 is attached to the lower casing 40, instead of the upper casing 42 so that the assembly work is simplified. Since the sheet spring 86 extends toward the upper surface 50B of the ring member 50 in a direction inclined with respect to both the tangential direction and the radial direction of the ring member 50, the necessary length of the sheet spring 86 can be reduced as compared to the case where the sheet spring 86 extends in the tangential direction in plan view so that the space requirement for the sheet spring 86 can be reduced.

The rotational direction of the mower motor 30 is strictly in the counterclockwise direction in top view (as seen in FIG. 7). Therefore, the rotation prevention mechanism for preventing the rotation of the support member 60 may include only one sheet spring 66 for opposing the clockwise rotation of the support member 60 as shown in FIG. 7. In particular, the rotation prevention mechanism may include only one sheet spring 66 for opposing the clockwise rotation of the support member 60 relative to the lawnmower main body 12 (the lower casing 40 and the upper casing 42). The clockwise rotation of the support member 60 with respect to the lower casing 40 and the upper casing 42 corresponds to the downward movement of the support member 60 relative to the ring member 50 due to the screw thread engagement between the female screw thread 56 and the male screw thread 62.

Thus, the rotation prevention mechanism tends to oppose the downward movement of the support member 60 under the weight of the mower motor 30.

The resilient force provided by the sheet spring 66 substantially balances out the weight of the mower motor 30 so that the vertical load acting between the female screw thread 56 and the male screw thread 62 is substantially reduced. As a result, the friction between the female screw thread 56 and the male screw thread 62 can be minimized, and the loading on the mower motor 30 can be decreased as a result.

The present invention has been described in terms of specific embodiments, but is not limited by such embodiments, and can be modified in various ways without departing from the scope of the present invention.

For instance, the sheet spring 66 (second elastic member) may consist of two sheet springs 66 having a similar configuration and arranged one above the other. Instead of the screw thread engagement between the female screw thread 56 and the male screw thread 62, a cam mechanism including a spiral or otherwise inclined cam slot and a pin received in the cam slot may also be used. The motor for rotationally driving the pinion 72 may also consist of any other form of servomotor, instead of the stepping motor 80. It is also within the purview of the present invention to use a manually operated height adjusting mechanism, instead of the motor driven height adjusting mechanism.

The present invention may also be applied to other forms of working machines such as cultivators, snow blowers and so on. Also, the various components used in the illustrated embodiments are not necessarily essential for the present invention, and various substitutions, additions and omissions can be made without departing from the scope of the present invention.

The invention claimed is:

1. A work machine, comprising:
   a machine main body;
   an adjusting drive member supported on the machine main body against a downward movement so as to be rotatable around a vertical axis;
   an adjusting driven member engaged by the adjusting drive member via a converting mechanism that converts a rotational motion of the adjusting drive member into a vertical motion of the adjusting driven member;
   a work unit supported by the adjusting driven member; and
   a first elastic member provided on the machine main body and resiliently and slidably abutting against the adjusting drive member to urge the adjusting drive member in a downward direction.

2. The work machine as defined in claim 1, wherein the adjusting drive member comprises a ring member having a female screw thread on an inner circumferential surface thereof, and the adjusting driven member comprises a support member supporting the work unit, and having a male screw thread on an outer circumferential surface thereof threaded into the female screw thread, a rotation preventing mechanism for preventing the support member from rotating relative to the machine main body, but allowing the support member to move vertically being interposed between the support member and the machine main body.

3. The work machine as defined in claim 2, wherein the rotation preventing mechanism comprises a vertical surface formed on the support member at an angle to a circumferential direction thereof, and a second elastic member secured to the machine main body and resiliently abutting against the vertical surface.

4. The work machine as defined in claim 1, wherein the adjusting drive member rests upon an upper surface of the machine main body at a lower surface thereof.

5. The work machine as defined in claim 4, wherein the upper surface of the machine main body is provided with an arcuate rib extending upright therefrom, and the lower surface of the adjusting drive member is provided with an arcuate recess receiving the arcuate rib so as to allow the adjusting drive member to rotate and move upward along the arcuate rib.

6. The work machine as defined in claim 4, wherein the first elastic member comprises a sheet spring having a base end secured to the machine main body, and a contact part extending from the base end and abutting against the upper surface of the adjusting drive member.

7. The work machine as defined in claim 6, wherein the first elastic member comprises a pair of sheet springs arranged in a mutually line symmetric relationship in plan view.

8. The work machine as defined in claim 6, wherein the upper surface of the adjusting drive member is formed with a plurality of recesses arranged circumferentially and each configured to receive the contact part of the sheet spring.

9. The work machine as defined in claim 8, wherein the contact part of the sheet spring is bent or curved around an axial line extending horizontally and orthogonal to an extending direction of the sheet spring, and the recesses each consist of a groove configured to receive the contact part.

10. The work machine as defined in claim 9, wherein the sheet spring extends in a tangential direction with respect to the adjusting drive member, and each groove extends in a radial direction.

11. The work machine as defined in claim 9, wherein the sheet spring extends in a direction at an angle to each of a tangential direction and a radial direction with respect to the adjusting drive member, and each groove extends in a lateral direction with respect to the extending direction of the sheet spring.

12. The work machine as defined in claim 8, wherein the work machine comprises an electric motor configured to rotationally drive the adjusting drive member to any one a plurality of discrete angular positions, and the recesses are positioned so as to correspond to the discrete angular positions of the adjusting drive member.

13. The work machine as defined in claim 8, further comprising gear teeth formed along an outer periphery of the ring member, a pinion rotatably supported by the machine main body and meshing with the gear teeth, and an electric motor configured to rotationally drive the pinion.

14. The work machine as defined in claim 1, wherein the adjusting driven member is provided with a hollow interior, and the work unit includes an electric motor received in the hollow interior and having a downwardly extending output shaft, and a cutting blade fitted on the output shaft.

* * * * *